(12) United States Patent
Kallioniemi et al.

(10) Patent No.: US 8,083,033 B2
(45) Date of Patent: Dec. 27, 2011

(54) ELEVATOR SYSTEM WITH CONTROL TO ALLOCATE A CALL BASED ON CHARGING STATUS OF ENERGY STORAGE, AND METHOD OF CONTROLLING AN ELEVATOR GROUP

(75) Inventors: Antti Kallioniemi, Jokela (FI); Ilpo Haipus, Nummela (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 12/987,628

(22) Filed: Jan. 10, 2011

(65) Prior Publication Data

US 2011/0120811 A1 May 26, 2011

Related U.S. Application Data

(63) Continuation of application No. PCT/FI2009/000072, filed on Aug. 3, 2009.

(30) Foreign Application Priority Data

Aug. 21, 2008 (FI) .................................... 20080474

(51) Int. Cl.
*B66B 1/06* (2006.01)
(52) U.S. Cl. ........................................ 187/290; 187/391
(58) Field of Classification Search .................. 187/247, 187/277, 290, 293, 296, 297, 380–388, 391–393; 318/799–815
See application file for complete search history.

(56) References Cited

U.S. PATENT DOCUMENTS

| 5,732,795 | A | * | 3/1998 | McCarthy et al. | ............ 187/250 |
| 5,896,948 | A | * | 4/1999 | Suur-Askola et al. | ........ 187/290 |
| 6,315,081 | B1 | | 11/2001 | Yeo | |

(Continued)

FOREIGN PATENT DOCUMENTS

WO   WO 02/066355 A2   8/2002

OTHER PUBLICATIONS

International Search Report for PCT/FI2009/000072, mailed on Nov. 3, 2009.

(Continued)

*Primary Examiner* — Anthony Salata
(74) *Attorney, Agent, or Firm* — Birch, Stewart, Kolasch & Birch, LLP (57) ABSTRACT

An elevator system and a method are provided for controlling an elevator group. The elevator system includes an elevator group, which includes at least two elevator cars, which elevator cars are fitted to be moved in the elevator hoistway according to the calls allocated by the control of the elevator group. The elevator system includes a power supply arrangement, for adjusting the power needed to move the elevator cars. An energy storage is connected to the power supply arrangement. The energy storage is fitted in the first operating situation to yield energy for use in moving the elevator car, and in the second operating situation to receive energy released by movement of the elevator car. The elevator system includes a determination of the charging status of the energy storage, and the control of the elevator group is fitted to determine the change in energy that would be caused by the movement according to an allocated call of the elevator cars belonging to the elevator group. The control of the elevator group is fitted to allocate a call by favoring in the allocation an elevator car, the determined change in energy caused by the movement of which best meets the allocation criterion.

20 Claims, 5 Drawing Sheets

U.S. PATENT DOCUMENTS

| | | | |
|---|---|---|---|
| 7,246,686 B2 * | 7/2007 | Smith et al. | 187/290 |
| 7,540,355 B2 * | 6/2009 | Harkonen | 187/290 |
| 7,559,407 B2 * | 7/2009 | Siikonen et al. | 187/382 |
| 7,681,694 B2 * | 3/2010 | Aulanko et al. | 187/290 |
| 7,748,502 B2 * | 7/2010 | Ueda et al. | 187/293 |
| 7,909,143 B2 * | 3/2011 | Tyni et al. | 187/382 |
| 7,913,819 B2 * | 3/2011 | Siikonen et al. | 187/382 |
| 2001/0017242 A1 | 8/2001 | Tajima et al. | |
| 2002/0179376 A1 | 12/2002 | Tominaga et al. | |
| 2005/0006183 A1 | 1/2005 | Smith et al. | |
| 2005/0263355 A1 | 12/2005 | Kostka | |
| 2009/0218175 A1 * | 9/2009 | Wesson et al. | 187/290 |
| 2011/0144810 A1 * | 6/2011 | Wesson et al. | 700/275 |

OTHER PUBLICATIONS

Written Opinion of the International Searching Authority, mailed on Nov. 3, 2009, issued in PCT/FI2009/000072.

* cited by examiner

1: 1st elevator car
1': 2nd elevator car
2: 1st elevator hoistway
2': 2nd elevator hoistway
3: Control
5: 1st power supply circuit
5': 2nd power supply circuit
6: 1st energy storage
6': 2nd energy storage
7: 1st DC/DC transformer
7': 2nd DC/DC transformer
8, 8': Counterweight
9, 9': Floor level
11: Electricity network
13: 1st motor
13': 2nd motor
19, 19': Rectifying bridge
20: 1st motor bridge
20': 2nd motor bridge
21, 21': Intermediate circuit
22: Determiner

1, 1', 1": 1st, 2nd, 3rd elevator car
2, 2', 2": 1st, 2nd, 3rd elevator hoistway
3: Control
5, 5', 5": 1st, 2nd, 3rd power supply circuit
6: Energy storage
7: DC/DC transformer
8, 8', 8": Counterweight 9, 9', 9": Floor level
11: Electricity network
13, 13', 13": 1st, 2nd, 3rd motor
19, 19', 19": Rectifying bridge
20, 20', 20": 1st, 2nd, 3rd motor bridge
21: Intermediate circuit
22: Determiner

Fig. 3

1, 1': 1st, 2nd elevator car
2, 2': 1st, 2nd elevator hoistway
3: Control
5, 5': 1st, 2nd power supply circuit
6, 6': 1st, 2nd energy storage
7, 7': 1st, 2nd DC/DC transformer
9, 9': Floor level
11: Electricity network
13, 13': 1st, 2nd motor
22: Determiner

ELEVATOR SYSTEM WITH CONTROL TO ALLOCATE A CALL BASED ON CHARGING STATUS OF ENERGY STORAGE, AND METHOD OF CONTROLLING AN ELEVATOR GROUP

CROSS REFERENCE TO RELATED APPLICATION

This application is a Continuation of PCT International Application No. PCT/FI2009/000072 filed on Aug. 3, 2009, which claims priority under 35 U.S.C. 119(a) to Patent Application No. 20080474 filed in Finland, on Aug. 21, 2008. The entire contents of all of the above applications is hereby incorporated by reference into the present application.

BACKGROUND OF THE INVENTION

1. Field of the Invention

The object of the invention is a control of an elevator group, and also a method for allocating calls in an elevator system in such a way that set objectives are fulfilled.

2. Background of the Invention

Among many other different tasks, one basic function of a control of an elevator group is the allocation of calls. The objective of allocation is to give calls to be served by the elevator cars in such a way that some performance indicator describing the system is as good as possible. Conventionally the most commonly used performance indicators relate to call times and passenger waiting times. Typically averages are calculated from these times and their distributions are determined. It can also be arranged such that different indicators are weighted in different traffic situations. This is to give the system the opportunity to adapt to the prevailing traffic situation.

The power requirement of an elevator system varies according to the loading and the control situation. For example, during acceleration the power requirement is transiently over double compared to the power required during even speed. In this case the current taken by the elevator from the supply network of the building also varies, and e.g. dimensioning of the fuses in the electricity supply of the building must be done according to the maximum supply current of the elevator. The elevator also returns some of the committed energy to the system during motor braking. This energy returned to the power supply system is conventionally converted into heat in a separate power resistor or it is returned to the supply network.

SUMMARY OF THE INVENTION

The purpose of the invention is to solve the aforementioned problems as well as the problems disclosed in the description of the invention below. One purpose of the invention is to serve the passengers of an elevator such that the energy consumption of the elevator system is made to stay as low as possible.

Some inventive embodiments are also discussed in the descriptive section of the present application. The inventive content of the application can also be defined differently than in the claims presented below. The inventive content may also consist of several separate inventions, especially if the invention is considered in the light of expressions or implicit subtasks or from the point of view of advantages or categories of advantages achieved. In this case, some of the attributes contained in the claims below may be superfluous from the point of view of separate inventive concepts.

The elevator system according to the invention comprises an elevator group, which comprises at least two elevator cars. The elevator cars are fitted to move in the elevator hoistway, according to the calls allocated by the control of the elevator group. The elevator system comprises a power supply arrangement, for adjusting the power needed to move the elevator cars. An energy storage is connected to the power supply arrangement, which is fitted in the first operating situation to yield energy for use in moving the elevator car, and also in the second operating situation to receive energy released by movement of the elevator car. The elevator system comprises a determination of the charging status of the energy storage. The control of the elevator group is fitted to determine the change in energy that would be caused by the movement according to an allocated call of the elevator cars belonging to the elevator group. The control of the elevator group is fitted to allocate a call by favoring in the allocation an elevator car, the determined change in energy caused by the movement of which best meets the allocation criterion, which allocation criterion is determined according to the charging status of the energy storage.

In the method according to the invention for allocating calls in an elevator system, an energy storage is fitted to the power supply arrangement of the elevator system; the charging status of the energy storage is determined; an allocation criterion is determined according to the determined charging status of the energy storage; the change in energy that would be caused by the movement according to an allocated call of the elevator cars belonging to the elevator group; and also a call is allocated by favoring in the allocation an elevator car, the determined change in energy caused by the movement of which best meets the allocation criterion, which allocation criterion is determined according to the charging status of the energy storage.

When minimizing the energy consumption of an elevator group it is essential to minimize the amount of energy taken from the power source by the elevator system and the amount of energy returned to the power source of the elevator system in different operating situations of the elevator system. Thus, the control of an elevator group according to the invention is based on fitting the change in energy caused by movement of the elevator cars to be convergent with the amount of energy that can be charged into the energy storage/discharged from the energy storage is taken as one objective of the allocation of the elevator cars.

Furthermore, if large elevator groups and high buildings are involved, a maximum waiting time can be held as an additional criterion in the control method, i.e. a certain maximum waiting time is determined within the scope of which calls are allocated while simultaneously minimizing energy consumption.

With the invention at least one of the following advantages, among others, is achieved:

By means of the control of the elevator group according to the invention the energy consumption of the elevator system can be substantially reduced.

Energy can be charged into the energy storage or energy can be discharged from the energy storage for adjusting the power required to move the elevator car in different traffic situations of the elevator system.

At the same time as the energy consumption of the elevator system decreases, the dimensioning of the mains electricity connection of the building can also be reduced. The costs of the electricity supply of the building can also be reduced by decreasing the fuse size of the mains electricity connection. In some cases it is also possible to replace the three-phase mains electricity connection with a single-phase connection.

Owing to the group control of the invention, an energy storage that is of smaller capacity than in prior art can be connected to the power supply arrangement. In this case the energy storage can also be smaller in its size than prior art, and it can if necessary easily be disposed e.g. in the elevator hoistway. This is an advantage in particular in so-called elevator systems without machine room, in which the hoisting machine of the elevator and often also the power supply apparatus of the elevator motor is fitted into the elevator hoistway.

BRIEF DESCRIPTION OF THE DRAWINGS

In the following, the invention will be described in more detail with reference to the attached drawings, wherein.

DETAILED DESCRIPTION OF THE PREFERRED EMBODIMENTS

Figure 1:
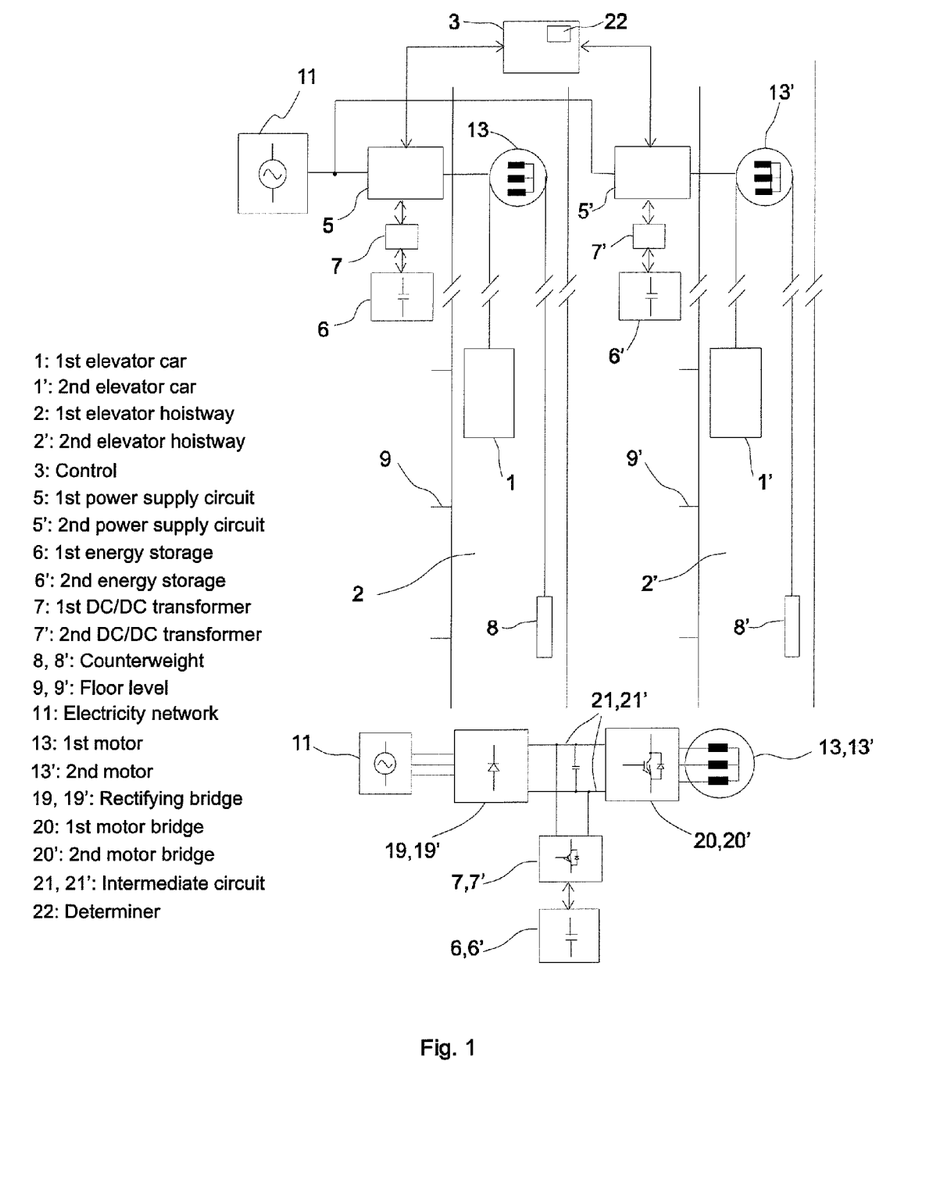
FIG. 1 presents an elevator system according to the invention

FIG. 1 presents an elevator system, which comprises a control 3 of the elevator group according to the invention. The elevator group comprises two elevator cars 1,1', of which the first elevator car 1 is fitted into a first elevator hoistway 2 and the second elevator car 1' is fitted into a second elevator hoistway 2'. The elevator cars 1, 1' are moved in the elevator hoistways 2, 2' in an essentially vertical direction according to the calls allocated by the control 3 of the elevator group.

Call-giving appliances are fitted to the floor levels 9 as well as in the elevator cars 1,1' in the elevator system, the calls generated with which appliances are sent to the control 3 of the elevator group via a communication channel. There are different call-giving appliances of an elevator, and depending on the elevator system e.g. so-called destination calls can also be sent with them in addition to conventional calls. A destination call comprises information about both the departure floor and the destination floor of the run. In the embodiment of the invention according to FIG. 1 the floor levels have call-giving appliances that enable the sending of a destination call. Additionally, proximity sensors that are, in themselves, prior art can be fitted in connection with the floor levels. Proximity sensors send an electromagnetic measuring signal, with which the number of passengers waiting for an elevator on a floor level is determined. On the basis of the number of passengers, the load of the elevator car is further estimated. On the other hand, the loading of the elevator car can also be estimated e.g. on the basis of the number of calls given from the landing. The call-giving appliances can comprise means for reporting the number of passengers. On the other hand a destination call and the number of passengers can be reported to the control 3 of the elevator group e.g. via a microphone and a speech recognition apparatus.

In the embodiment of FIG. 1, the first elevator car 1 is moved with the first elevator motor 13 and the second elevator car 1' is moved with the second elevator motor 13'. In this case the elevator car 1,1' and the counterweight 8,8' are connected to the traction sheave of the elevator motor via the elevator ropes.

When the elevator car 1,1' moves in the heavy direction, the force effect of the elevator motor 13, 13' moving the elevator car is in the direction of the movement of the elevator car. In this case e.g. in the elevator system according to FIG. 1 an essentially empty elevator car moves downwards or an essentially fully loaded elevator car moves upwards. When, on the other hand, the elevator car 1,1' moves in the light direction, the force effect of the elevator motor 13, 13' moving the elevator car 1,1' is in the opposite direction to the movement of the elevator car.

The elevator system comprises a power supply arrangement, which comprises a first 5 and a second 5' power supply circuit. The first power supply circuit 5 comprises a first frequency converter for adjusting the power needed to move the first elevator car 1. The second power supply circuit 5' comprises a second frequency converter for adjusting the power needed to move the second 1' elevator car. Each of the frequency converters comprises a rectifying bridge 19, which is fitted between the electricity network 11 and the intermediate circuit 21 of the frequency converter, as well as a motor bridge 20, which is fitted between the intermediate circuit 21 and the elevator motor 13. The aforementioned motor bridges 20 comprise controllable solid-state switches, such as IGBT transistors, for supplying variable-frequency and variable-amplitude voltage to the windings of the elevator motors. A first energy storage 6 is connected via a first DC/DC transformer 7 to the intermediate circuit 21 of the first frequency converter, and a second energy storage 6' is connected via a second DC/DC transformer 7' to the intermediate circuit 21' of the second frequency converter. Both the first 6 and the second 6' energy storage comprise supercapacitors connected in series with each other.

The DC/DC transformers 7, 7' are fitted to supply power between the energy storage 6, 6' and the intermediate circuit 21, 21' of the frequency converter such that the energy storage is fitted in the first operating situation to yield energy for use in moving the elevator car 1,1', and also in the second operating situation to receive energy released by movement of the elevator car. When the elevator car moves in the heavy direction, power is supplied from the energy storage 6,6' via the intermediate circuit 21, 21' of the frequency converter to the elevator motor. When the elevator car moves in the light direction, the braking energy of the elevator motor is supplied to the energy storage via the intermediate circuit 21, 21' of the frequency converter.

Each of the aforementioned DC/DC transformers comprises at least one controllable solid-state switch, for adjusting the power supply between the energy storage and the intermediate circuit of the frequency converter. The DC/DC transformer determines at least one electrical magnitude of the power supply, e.g. the voltage and/or the current of the energy storage. The DC/DC transformer can send the measuring data of the aforementioned electrical magnitude to the control 3 of the elevator group via the communication channel between them, in which case the control of the elevator group determines the charging status of the energy storage on the basis of the measuring data. It is also possible that the DC/DC transformer determines the charging status of the energy storage on the basis of the aforementioned electrical magnitude, and communicates the determined charging status directly to the control 3 of the elevator group.

The charging status of the energy storage 6, 6' is proportional to the amount of energy contained in the energy storage. Since the capacity of the energy storage is known, by means of the capacity and the charging status of the energy storage the amount of energy that can be charged into the energy storage and/or the amount of energy that can be discharged from the energy storage can be determined in a manner that is in itself prior art.

The control 3 of the elevator group is fitted to determine the change in energy that would be caused by the movement according to an allocated call of the elevator cars 1,1' belonging to the elevator group. In this case a determiner 22 of energy is fitted in connection with the control 3 of the elevator group, which determiner serves the control 3 of the elevator group offering it change data of the energy connected to runs of the cars required by the allocation. The determiner of energy calculates the change data of the energy in response to different call options received from the control of the elevator group. The parameters needed in the calculation are, among others, the drive direction of the elevator car, the run distance, and also the loading of the elevator car.

The control 3 of the elevator group is fitted to allocate a call by favoring in the allocation an elevator car 1,1', the determined change in energy caused by the movement of which best meets the allocation criterion of the determined charging status of the energy storage 6,6'. In this case fitting of the change in energy caused by the aforementioned movement of the elevator car 1, 1' is taken as an objective of the allocation of the elevator group such that the energy needed to move the elevator car/released by the movement of the elevator car can be as comprehensively as possible discharged from the energy storage 6, 6' or charged into the energy storage, depending on the operating situation of the elevator system. For this fitting e.g. a cost function, which is in itself prior art, can be used.

Figure 2:
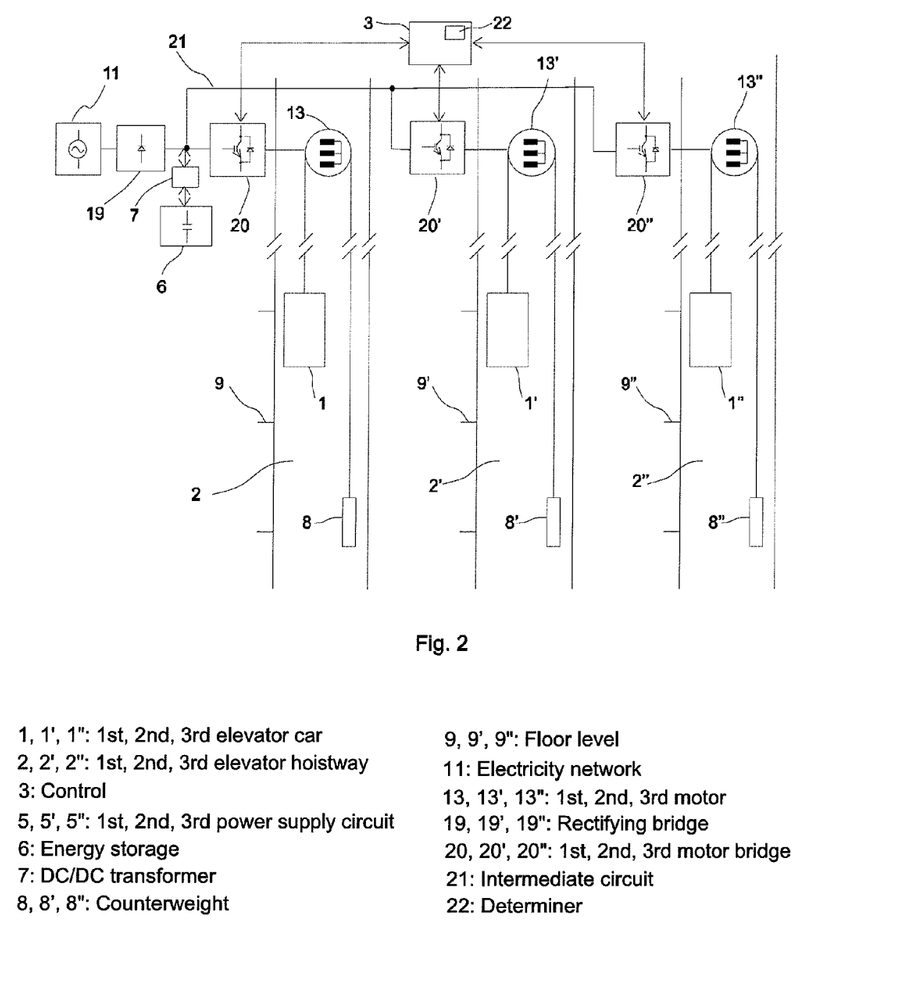
FIG. 2 presents a second elevator system according to the invention

In the elevator system according to FIG. 2, conventional call-giving appliances, with which it is not possible to give a destination call, are fitted on at least some floor levels 9. The elevator system comprises three elevator cars 1, 1', 1", which are fitted into elevator hoistways 2, 2', 2". The motors 13, 13', 13" are connected to a common power supply circuit 5. A frequency converter, which comprises three motor bridges 20, 20', 20" and one rectifying bridge 19, is used for adjusting the power. The rectifying bridge and the motor bridges are connected to a common intermediate circuit 21. The first motor bridge 20 is connected to a first motor 13, the second motor bridge 20' is connected to a second motor 13', and the third motor bridge 20" is connected to a third motor 13". An energy storage 6 is connected to the common intermediate circuit 21. In this case when the first elevator car moves in the light direction, energy is returned to the common intermediate circuit, from where it can if necessary be transferred for use by the second elevator car moving in the heavy direction, in which case the amount of energy discharged from the energy storage 6 and/or charged into the energy storage 6 decreases. When allocating calls, the control 3 of the elevator group in this case favors in the allocation elevator cars 1,1',1", the change in total energy caused by the simultaneous movement of which best meets the allocation criterion, which allocation criterion is determined at least according to the charging status of the energy storage 6. The maximum waiting time, i.e. a certain maximum waiting time is determined, can be used as an additional criterion in allocating, within the scope of which calls are allocated while simultaneously minimizing energy consumption.

It is also possible that, in addition to a landing call, the control of the elevator group allocates a surplus additional call to some free elevator car of the elevator system. In this case it is endeavored to fit the change in total energy caused by the simultaneous movement of an elevator car transporting passengers and an empty elevator car to be moved to accord with the allocation criterion.

Figure 3:
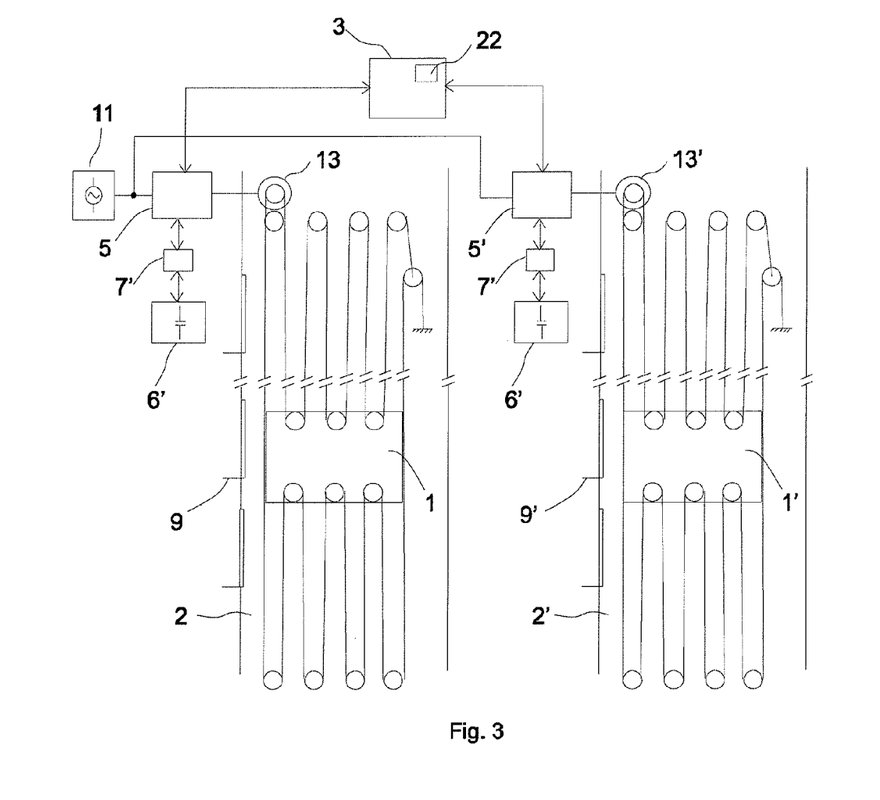
FIG. 3 presents a third elevator system according to the invention

FIG. 3 presents an elevator system, which comprises two elevators without counterweight. The elevators without counterweight have separate power supply circuits 5, 5'. Energy storages 6, 6' are connected to separate power supply circuits. In the elevator system according to the embodiment of FIG. 3, the heavy drive direction of the elevator car is always upwards; correspondingly, the light drive direction of the elevator car is always downwards. The allocation criterion of the control 3 of the elevator group according to the invention is in this embodiment of the invention determined according to the charging status of the first 6 and the second 6' energy storage as well as according to the departure floor of the run to be served. In this case in one run situation it is endeavored that when the run starts from a lower floor a charging status in which energy can be discharged from the energy storage is favored; correspondingly, when the run starts from a higher floor a charging status in which energy can be charged into the energy storage is favored. At intermediate floors the aforementioned most-favored criterion can be changed in stages.

Figure 4:
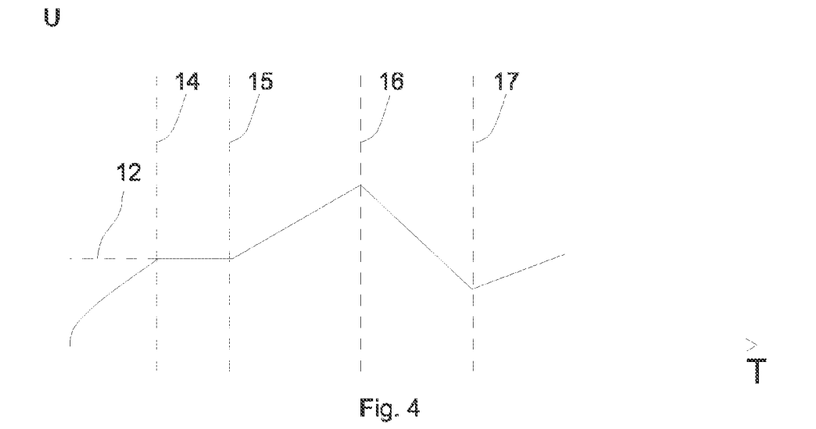
FIG. 4 presents the voltage of an energy storage in connection with the group control according to the invention
Figure 5:
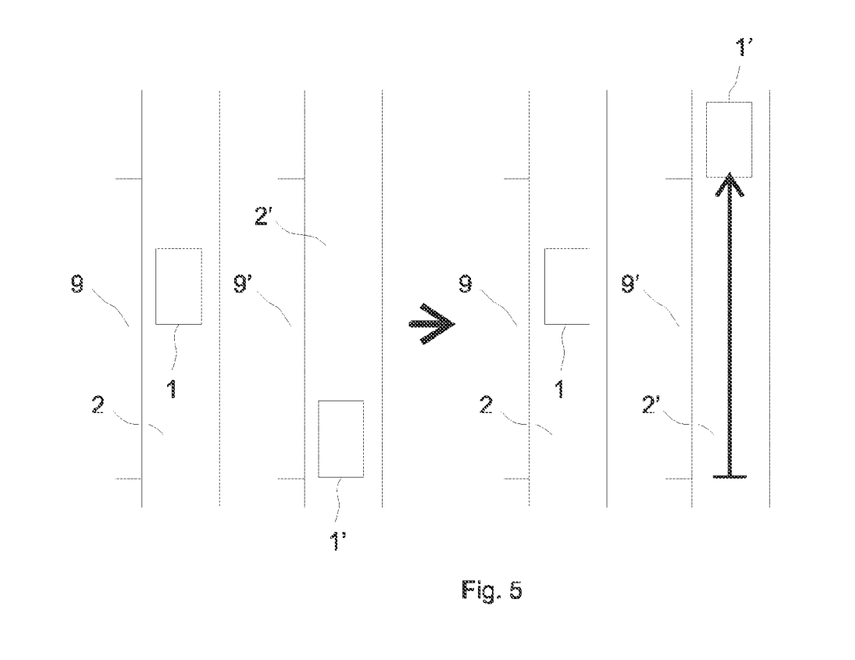
FIGS. 5-7 present embodiments of the allocation of calls according to the invention

In the situation according to FIG. 5 the first elevator car 1 is located at the second floor in the first elevator hoistway 2 and the second elevator car 1' is located at the first floor in the second elevator hoistway 2'. The power supply for moving the elevator cars occurs via separate power supply circuits 5,5' (not shown in figure). Separate energy storages 6,6' (not shown in figure) are also connected to the power supply circuits. FIG. 4 presents the voltage of an energy storage 6' comprising supercapacitors in an operating situation according to FIG. 5, when the control of the elevator group is allocating calls to the elevator cars 1,1'.

A voltage 12 according to the optimal charging status is in this case determined for the energy storages 6,6'. At the time t=0 the empty energy storages 6,6' start to be charged via the electricity network 11. At the time 14 the energy storages 6, 6' achieve the voltage 12 corresponding to the optimal charging status, and the information about this is communicated to the control 3 of the elevator group. After this the control 3 of the elevator group joins the elevator cars 1,1' to the group, and starts to allocate calls to them.

The control of the elevator group is fitted to allocate a call by favoring in the allocation the second elevator car 1', the change in energy caused by the movement of which best charges and discharges the energy storage 6' connected to the power supply circuit 5' of the motor 13' that moves the elevator car 1' towards the voltage 12 according to the optimal charging status of the energy storage 6'. The allocated call is a destination call, according to which the run starts from the second floor and ends at the third floor. Proximity sensors are fitted to the second floor, on the basis of the measuring signals of which a full load is determined for the elevator car.

At the time 15 the second elevator car starts to serve the aforementioned allocated call. First the elevator car 1' drives empty in the light direction from the first to the second floor, in which case during motor braking of the elevator motor the energy storage is charged, and the voltage of the energy storage increases. At the time 16 the elevator car is loaded on the second floor to essentially full load, and after this the elevator car 1' drives with full load in the heavy direction to the third floor. During the run in the heavy direction power is discharged from the energy storage 6' for use by the elevator motor, and the voltage of the energy storage decreases. At the time 17 the run ends, after which the energy storage is charged again via the electricity network 11 to its optimal charging status 12. It can be seen by examining the situation according to FIG. 5 that if the aforementioned call were allocated to the first elevator car 1, the voltage of the corresponding energy storage would at the end of the run be considerably lower and farther from the voltage 12 according to the optimal charging status than when allocating the call to a second elevator car 1'.

Figure 6:
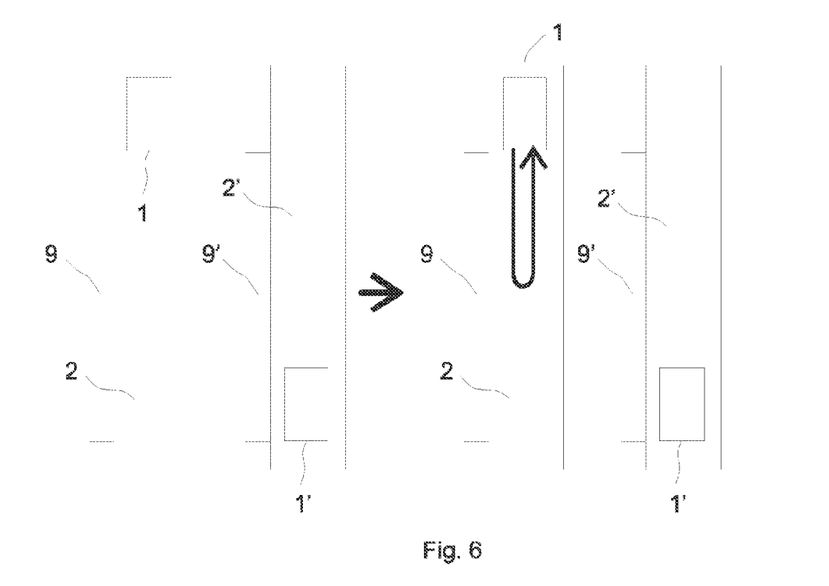
Figure 7:
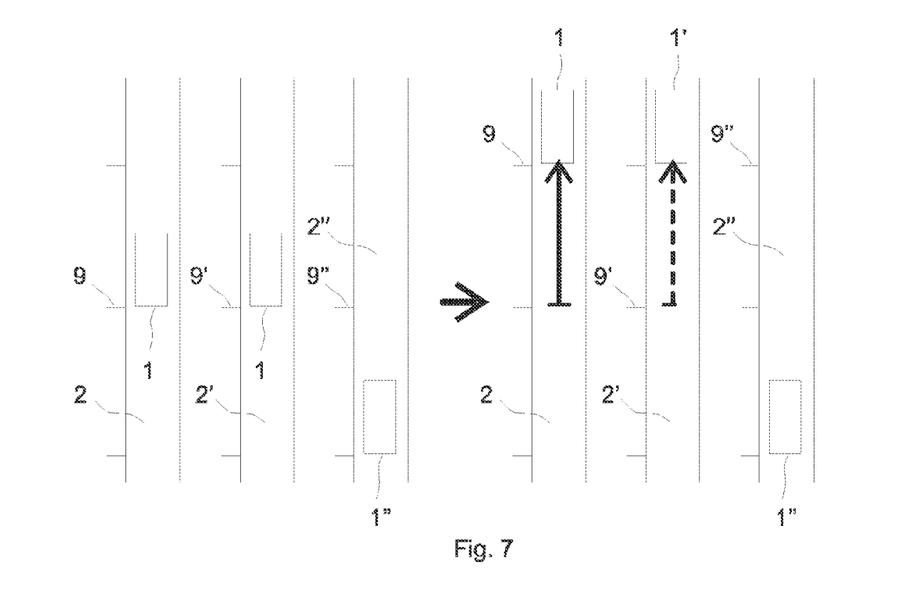

FIGS. 6 and 7 present illustrative additional examples of the use of the control method according to the invention.

The situation of FIG. 6 differs from what is presented in the embodiment of FIG. 5 in that when the run starts both energy storages are fully charged. In this embodiment of the invention the waiting time is used as an additional criterion in allocating calls. In this case the run must be started immediately, and there is not time to discharge the energy storages to their optimal charging status. Now the call is allocated to the first elevator car 1, which drives initially empty in the heavy direction downwards from the third to the second floor, in which case the energy storage is discharged. When an essentially full load is loaded into the elevator car, the elevator car drives back to the third floor, again in the heavy direction discharging the energy storage.

In the elevator system according to FIG. 7, the first 13, second 13' and third 13" elevator motor (not shown in figure) are supplied via a common power supply circuit 5 (not shown in figure). A common energy storage 6, which is essentially empty at the start of the run, is also connected to the power supply circuit. The control of the elevator group allocates the call to the first elevator car 1. The run starts from the second floor, according to the call. After this the run is directed to the third floor according to the call given from the car. The load-weighing device fixed to the floor of the elevator car reports that the elevator car is fully loaded. In this case the control of the elevator group allocates a surplus additional call to the second elevator car 1'. When the first elevator car 1 is driving in the heavy direction upwards, also the second elevator car 1' is driving at the same time upwards in the light direction empty, in which case the change in the total energy of the elevator system decreases.

One elevator system according to the invention comprises a determination of the operating status of the power source 11 of the elevator system. In this case during a determined malfunction of the power source 11 the control 3 of the elevator group is fitted to allocate a call by favoring in the allocation an elevator car 1,1', the determined change in energy caused by the movement of which best meets the allocation criterion, which allocation criterion is determined according to the charging status of the energy storage 6,6'. The determination of the operating status of the aforementioned power source can be performed e.g. by measuring the voltage of the power source. In this case a malfunction can be determined e.g. on the basis of a reduction in voltage or on the basis of a disconnection of the voltage supply.

The invention is not limited solely to the embodiments described above, but instead many variations are possible within the scope of the inventive concept defined by the claims below.

The elevator system according to the invention can also comprise more than one elevator group. In addition, the elevator system can also comprise elevators that do not belong to an elevator group.

The allocation criterion according to the invention can be defined in many different ways; the optimal charging state can be a constant, or it can vary e.g. as a function of the position of the elevator car. The optimal charging status can also be determined dynamically according to the traffic situation. On the other hand, the optimal charging status can also be determined on a time-oriented basis, in which case the optimal charging status can vary at different times of a 24-hour period.

The allocation criterion can comprise a number of optimal values, which can be weighted in different ways according to the operating situation of the elevator system.

The elevator system can comprise a number of elevator cars, moved independently or connected together, fitted into the same elevator hoistway.

The elevator motor can be a rotating motor or also a linear motor, in which case the moving rotor can be fixed to the elevator car.

The power source of the elevator system can be e.g. an electricity network, a generator, a fuel cell, and/or a UPS power source.

The energy storage can comprise a supercapacitor and/or an accumulator, e.g. a lithium-ion accumulator. The energy storage can also comprise e.g. a flywheel, a superconducting coil and/or a fuel cell. The energy storage can be connected directly to a power supply arrangement or e.g. via an inverter.

The invention claimed is:

1. An elevator system, comprising:
   an elevator group, which comprises at least two elevator cars, the elevator cars being fitted to be moved in the elevator hoistway, according to calls allocated by control of the elevator group;
   a power supply arrangement, for adjusting power needed to move the elevator cars, to which power supply arrangement an energy storage is connected;
   the energy storage being fitted in a first operating situation to yield energy for use in moving the elevator car and in a second operating situation to receive energy released by movement of the elevator car;
   a determination of a charging status of the energy storage;
   wherein the control of the elevator group is fitted to determine a change in energy that would be caused by the movement according to an allocated call of the elevator cars belonging to the elevator group; and
   wherein the control of the elevator group is fitted to allocate a call by favoring in the allocation an elevator car, the determined change in energy caused by the movement of which best meets the allocation criterion, wherein the allocation criterion is determined according to the charging status of the energy storage.

2. The elevator system according to claim 1, wherein the power supply arrangement comprises a first power supply circuit for adjusting the power needed to move the first elevator car of the at least two elevator cars, as well as a second power supply circuit for adjusting the power needed to move the second elevator car of the at least two elevator cars;
   a first energy storage is connected to the first power supply circuit, and a second energy storage is connected to the second power supply circuit; and
   the allocation criterion of the control of the elevator group is determined according to the charging status of both the first energy storage and of the second energy storage.

3. The elevator system according to claim 1, wherein the power supply arrangement comprises a common power supply circuit for adjusting the power needed to move the first elevator car and the second elevator car; and an energy storage is connected to the common power supply circuit.

4. The elevator system according to claim 1, wherein an optimal charging status is determined for the energy storage, and the control of the elevator group is fitted to allocate the call by favoring in the allocation an elevator car, the change in energy caused by the movement of which best charges or discharges the energy storage towards the optimal charging status.

5. The elevator system according to claim 1, wherein the elevator group comprises a first elevator car, which is fitted into a first elevator hoistway, and also a second elevator car, which is fitted into a second elevator hoistway.

6. The elevator system according to claim 1, wherein the control of the elevator group is fitted to determine the change in energy that would be caused by the movement according to an allocated destination call of the elevator cars belonging to the elevator group; and the control of the elevator group is fitted to allocate a destination call by favoring in the allocation an elevator car, the determined change in energy caused by the movement of which best meets the allocation criterion.

7. The elevator system according to claim 1, wherein the elevator system comprises a determination of an operating mode of a power source of the elevator system, and during a determined malfunction of the power source the control of the elevator group is fitted to allocate the call by favoring in the allocation an elevator car, the determined change in energy caused by the movement of which best meets the allocation criterion, wherein the allocation criterion is determined according to the charging status of the energy storage.

8. A method for allocating calls in an elevator system, said method comprising the steps of:

connecting an energy storage to a power supply arrangement of the elevator system;
determining a charging status of the energy storage;
determining a allocation criterion according to the determined charging status of the energy storage;
determining a change in energy that would be caused by movement according to an allocated call of the elevator cars belonging to the elevator group; and
allocating a call by favoring in the allocation an elevator car, the determined change in energy caused by the movement of which best meets the allocation criterion, wherein the allocation criterion is determined according to the charging status of the energy storage.

9. The method according to claim 8, further comprising the steps of:

adjusting power needed to move the first elevator car via a first motor bridge incorporated in a common power supply circuit;
adjusting power needed to move the second elevator car via a second motor bridge incorporated in the common power supply circuit;
determining the charging status of the energy storage connected to the common power supply circuit;
determining the change in total energy that would be caused by the movement of the first elevator car and the second elevator car connected to the common power supply circuit; and
allocating the call by favoring in the allocation an elevator car, the determined change in total energy caused by the movement of which best meets the allocation criterion, wherein the allocation criterion is determined at least according to the charging status of the energy storage.

10. The method according to claim 8, further comprising the steps of:

determining an optimal charging status for the energy storage; and
allocating the call by favoring in the allocation an elevator car, the change in energy caused by the movement of which best charges or discharges the energy storage towards the optimal charging status.

11. The method according to claim 8, wherein:
determining the change in energy that would be caused by the movement according to a destination call of the elevator cars belonging to the elevator group; and allocating a destination call by favoring in the allocation an elevator car, the determined change in energy caused by the movement of which best meets the allocation criterion.

12. The elevator system according to claim 2, wherein an optimal charging status is determined for the energy storage, and the control of the elevator group is fitted to allocate the call by favoring in the allocation an elevator car, the change in energy caused by the movement of which best charges or discharges the energy storage towards the optimal charging status.

13. The elevator system according to claim 3, wherein an optimal charging status is determined for the energy storage, and the control of the elevator group is fitted to allocate the call by favoring in the allocation an elevator car, the change in energy caused by the movement of which best charges or discharges the energy storage towards the optimal charging status.

14. The elevator system according to claim 2, wherein the elevator group comprises a first elevator car, which is fitted into a first elevator hoistway, and also a second elevator car, which is fitted into a second elevator hoistway.

15. The elevator system according to claim 3, wherein the elevator group comprises a first elevator car, which is fitted into a first elevator hoistway, and also a second elevator car, which is fitted into a second elevator hoistway.

16. The elevator system according to claim 4, wherein the elevator group comprises a first elevator car, which is fitted into a first elevator hoistway, and also a second elevator car, which is fitted into a second elevator hoistway.

17. The elevator system according to claim 2, wherein the control of the elevator group is fitted to determine the change in energy that would be caused by the movement according to an allocated destination call of the elevator cars belonging to the elevator group; and the control of the elevator group is fitted to allocate a destination call by favoring in the allocation an elevator car, the determined change in energy caused by the movement of which best meets the allocation criterion.

18. The elevator system according to claim 3, wherein the control of the elevator group is fitted to determine the change in energy that would be caused by the movement according to an allocated destination call of the elevator cars belonging to the elevator group; and the control of the elevator group is fitted to allocate a destination call by favoring in the allocation an elevator car, the determined change in energy caused by the movement of which best meets the allocation criterion.

19. The elevator system according to claim 4, wherein the control of the elevator group is fitted to determine the change in energy that would be caused by the movement according to an allocated destination call of the elevator cars belonging to the elevator group; and the control of the elevator group is fitted to allocate a destination call by favoring in the allocation an elevator car, the determined change in energy caused by the movement of which best meets the allocation criterion.

20. The elevator system according to claim 5, wherein the control of the elevator group is fitted to determine the change in energy that would be caused by the movement according to an allocated destination call of the elevator cars belonging to the elevator group; and the control of the elevator group is fitted to allocate a destination call by favoring in the allocation an elevator car, the determined change in energy caused by the movement of which best meets the allocation criterion.

* * * * *